United States Patent [19]

Osanai

[11] 4,341,981
[45] Jul. 27, 1982

[54] ROTARY DIRECTION REVERSING APPARATUS FOR A MOTOR OF A MICROCASSETTE TAPE TRANSPORT

[75] Inventor: Akira Osanai, Tokyo, Japan

[73] Assignee: Olympus Optical Co., Ltd., Tokyo, Japan

[21] Appl. No.: 137,465

[22] Filed: Apr. 4, 1980

[30] Foreign Application Priority Data

Apr. 20, 1979 [JP] Japan .................... 54/48692

[51] Int. Cl.³ ............................................. H02P 5/16
[52] U.S. Cl. ........................................ 318/6; 318/257; 318/294
[58] Field of Search ...................... 318/257, 294, 6; 360/74.1

[56] References Cited

U.S. PATENT DOCUMENTS

3,573,393  4/1971  Blackie et al. .................. 179/100.2
3,585,406  6/1971  Colter ............................. 318/681
3,896,358  7/1975  Tanikoshi ........................ 318/318

FOREIGN PATENT DOCUMENTS

2557798  6/1977  Fed. Rep. of Germany.

*Primary Examiner*—David Smith, Jr.
*Attorney, Agent, or Firm*—Frishauf, Holtz, Goodman & Woodward

[57] ABSTRACT

A direction reversing apparatus for a rotary motor of a microcassette tape transport includes a motor (14) having substantially the same characteristic for the forward and reverse motor rotation directions for driving a recording tape, and a motor controller (12) for setting a motor speed to a given speed. The reversing apparatus further includes a switch (16) coupled between the motor (14) and the motor controller (12) for reversing the direction of rotation of the motor (14).

6 Claims, 5 Drawing Figures

ROTARY DIRECTION REVERSING APPARATUS FOR A MOTOR OF A MICROCASSETTE TAPE TRANSPORT

BACKGROUND OF THE INVENTION

The invention relates to apparatus for reversing a rotatory direction of a motor, which is used for an auto-reverse type microcassette tape recorder.

A stable rotation is required for a motor used in a tape deck, because the stability of rotation greatly influences the wow and flutter characteristics of the tape deck. To this end, a motor for a one-motor type reversible tape deck is generally provided with two servo circuits, one for a forward rotation and the other for a reverse rotation. The reason for this is that the rotary characteristic of the motor has a transfer function expressed by a ratio of a mechanical output to an electric input of the motor, which depends on the rotary direction of the motor. In view of assembling such servo systems into a miniature mechanism such as a microcassette deck, the two-servo system encounters a difficulty that a restricted space rejects its use. The employment of the two-servo system increases the occurence of troubles in the servo circuits and the number of adjusting steps, resulting in an increase of cost to manufacture.

A motor with much the same characteristics for both the forward and the reverse rotations of the motor has recently been developed and put into a practical use. Such a motor has found its application in a so-called direct drive motor (DD) widely used in disc players or tape recorders currently being marketed. As far as the inventor knows, a miniature type device such as a microcassette tape recorder never employed a motor rotation direction reversing circuit capable of controlling the motor equally well in both the forward and reverse directions by a single servo system.

SUMMARY OF THE INVENTION

Accordingly, an object of the invention is to provide a motor rotation reversing apparatus for use in a microcassette recorder which is capable of controlling a motor rotation in a forward direction and a reverse direction by a single control circuit.

To achieve the above object of the invention, there is provided a motor rotation reversing apparatus comprising: a motor with the substantially the same characteristic for a forward rotation and reverse rotation, which drives a microcassette tape transport; a motor control means for setting a motor speed to a given value; and a switch means for switching the direction of a motor drive current, the switch means being disposed between the motor and the motor control means.

In the motor rotation reversing apparatus with such a construction, transfer functions, as complex functions expressed each by a ratio of a mechanical output of the motor to an electric input, are substantially the same for the forward rotation and the reverse rotation of the motor. Also, the transfer function of the motor control means is fixed in value. Therefore, the transfer function of a rotation control loop (servo loop) is invariable, irrespective of the direction of a motor rotation. This indicates that a rotation performance of the motor is the same for the forward rotation and the reverse rotation. This implies that only a one time adjustment of the motor speed is satisfactory for both the forward and reverse direction of the motor rotation. These useful features may be attained by the mere combination of a single motor and a single motor control circuit. The results from the use of the motor rotation reversing circuit of the present invention provide a miniaturization of the device size, a cost reduction of the device, and an improvement of the reliability of the device.

The above and other objects, and features, advantages and uses will be apparent as the description proceeds, when considered with the accompanying drawings.

DESCRIPTION OF THE PREFERRED EMBODIMENTS

Some preferred embodiments of the invention will be described referring to the accompanying drawings. In the description, like reference symbols designate like or equivalent portions or parts in the several views for simplicity of explanation.

Figure 1:
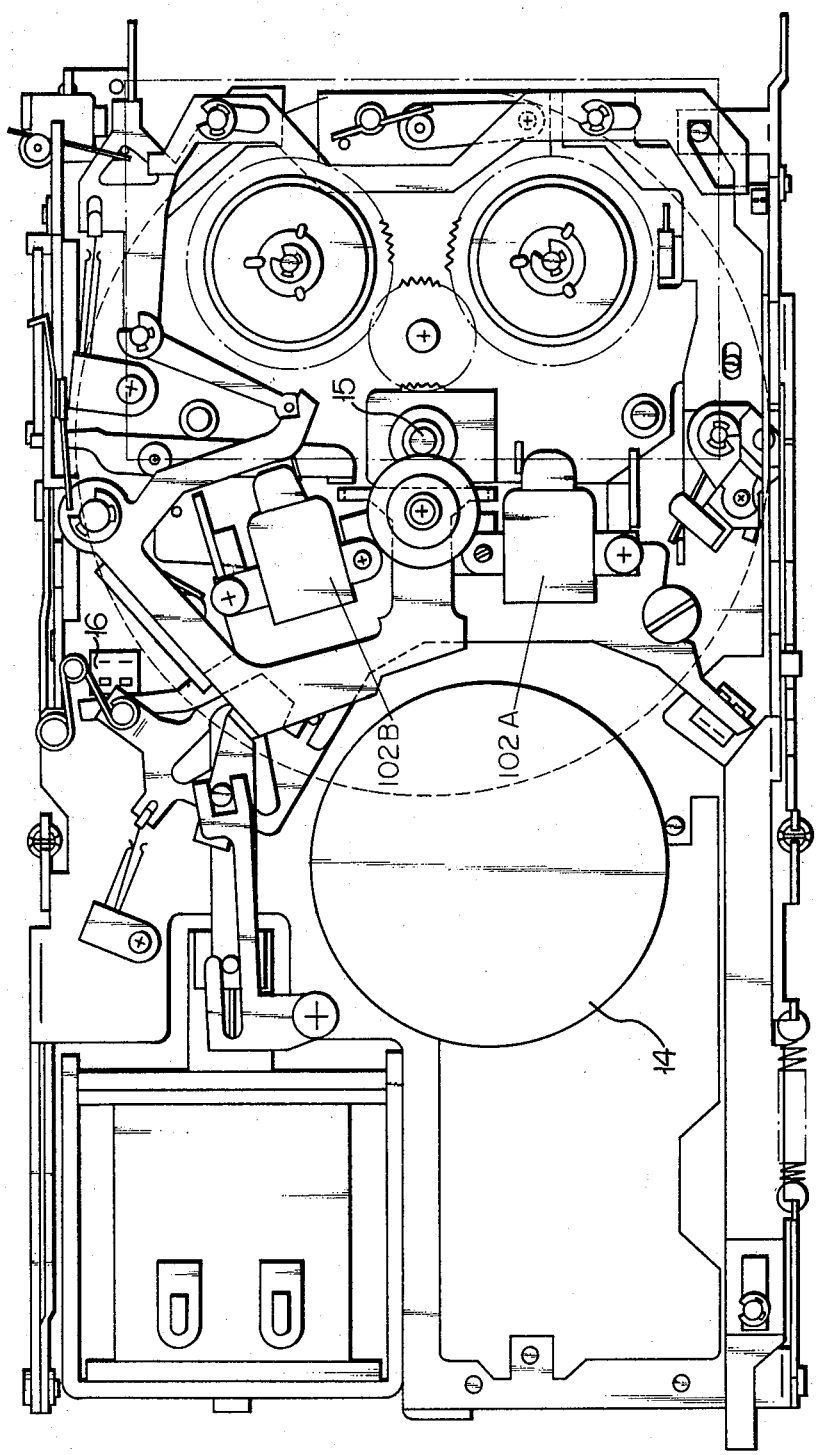
FIG. 1 is a plan view of a tape transport mechanism or an example of the structure of a tape transport deck to which the invention is applied.

Referring first to FIG. 1, there is shown a mechanism of a typical example of an auto-reverse tape transport of the center capstan type to which the invention is applied. The transport is for a microcassette. No elaboration of the transport mechanism will be given, with a mere description as to how a motor 14 to which the invention is applied is actually utilized. In FIG. 1, a capstan 15 driven by the motor 14 rotates uniformly in both clockwise and counterclockwise direction to draw the tape across record/playback heads 102A, 102B. For further details of the transport mechanism and its related electronic circuit, reference should be made to Japanese patent application Nos. 141616/'78 corresponds to U.S. application Ser. No. 90,900 filed Nov. 5, 1979 now U.S. Pat. No. 4,309,727, issued Jan. 5, 1982) and 41601/'79 (corresponds to U.S. application Ser. No. 134,064 filed Mar. 26, 1980 now U.S. Pat. No. 4,318,139, issued Mar. 2, 1982 assigned to the assignee (Olympus Optical Co. Ltd.) of the present patent application.

Figure 2:
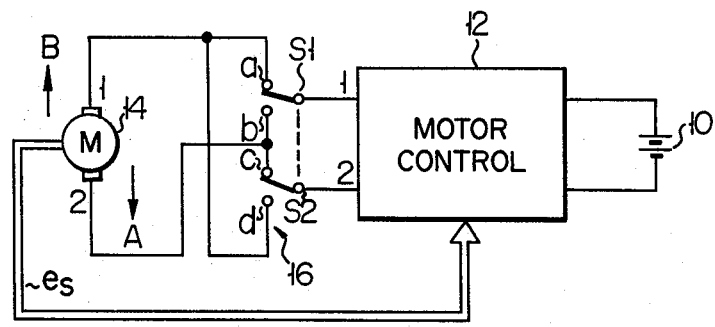
FIG. 2 is a schematic diagram of an embodiment of a motor rotation reversing apparatus according to the invention.

FIG. 2 shows an embodiment of the motor rotation reversing apparatus according to the invention. A first output terminal of a motor control circuit 12 supplied with power from a power source 10, is connected through a first contact a of a switch S1 to a first terminal of a motor 14. The motor control circuit 12 may be constructed by using model TCA955 speed regulator IC made by SIEMENS Co. Ltd. in West German, for example. The connection of the TCA955 with the motor 14 is described in detail in the application note published by this company. It is evident that the control circuit 12 is not limited to the TCA955. The motor suitable for the motor 14 is, for example, a DC servo motor with a frequency generator of which the forward and reverse characteristics are the same. Such a motor is, for example, model MMX-5 provided from Matsushita Electric Co. Ltd., Japan or model LS16-TA provided from Copal Electric Co. Ltd., Japan.

The second output terminal of the control circuit 12 is connected to the second terminal of the motor 14, through a first contact c of a switch S2. A second contact b of the switch S1 is connected to the first contact c of the switch S2 and a second contact d of the switch S2 is connected to the first contact a of the switch S1. The switches S1 and S2 are of the double gang two contact type (i.e., combined they form a double pole-double throw switch) and generally designated by reference numeral 16. The switch 16 is switched interlockingly with an operation mode switching mechanism of a tape deck transport shown in FIG. 1. For example, it is switched in a reverse or rewind mode. Upon the switching, the current direction of the current fed to the motor 14 is switched to the direction indicated by an arrow A or by an arrow B. With the switching of the current direction, the rotation direction of the motor 14 is reversed or inverted.

A servo detection signal $e_s$ corresponding to a motor speed of the motor 14 has the number of pulses corresponding to the number of rotations of the motor 14. The servo system so operates as to fix the frequency of the pulse. When the transfer function of the motor 14 is substantially common for the forward and reverse rotations, reversing the rotation of the motor 14 by the switch 16 provides no change of the servo characteristic.

Figure 3:
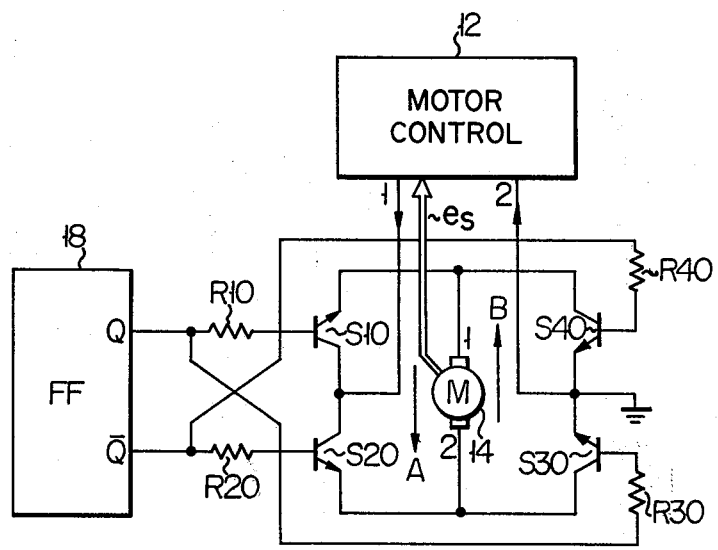
FIG. 3 illustrates in block and circuit forms a modification of the motor rotation reversing apparatus shown in FIG. 2.

Referring to FIG. 3, there is shown a motor reversing circuit in which the switch 16 shown in FIG. 2 is replaced by an electronic switch. The first output terminal Q of a flip-flop 18 is connected to the bases of NPN transistors S10 and S30, by way of respective resistors R10 and R30. The second output terminal $\overline{Q}$ of the flip-flop 18 is connected to the bases of NPN transistors S20 and S40, via respective resistors R20 and R40. The emitters of the transistors S30 and S40 are connected to the second output terminal of the motor control circuit 12. The first output terminal of the motor control circuit 12 is connected to the collectors of the transistors S10 and S20. The emitter of the transistor S10 and the collector of the transistor S40 are connected to the first terminal of the motor 14. The second terminal of the motor 14 is connected to the emitter of the transistor S20 and the collector of the transistor S30.

The motor reversing circuit shown in FIG. 3 operates in the following manner. Assume that the flip-flop 18 is set at the time of a forward reproduction or playback. In this case, the flip-flop 18 has logical "1" at the first output terminal Q and logical "0" at the second output terminal $\overline{Q}$. With these logical states of the outputs of the flip-flop 18, the transistors S10 and S30 are turned on while the transistors S20 and S40 are turned off. Current fed out of the first output terminal of the control circuit 12 flows in the direction of an arrow A, through the transistor S10, the motor 14 and the transistor S30. At this time, the motor 14 is in the forward rotation mode.

The reverse reproduction mode follows. In this case, the flip-flop 18 is reset and Q="0" and $\overline{Q}$="1". In turn, the transistors S20 and S40 are turned on while the transistors S10 and S30 are turned off. Then, the direction of the current flowing into the motor 14 as is indicated by an arrow B and reverses the rotation of the motor 14.

As seen from the foregoing, the motor reversing circuit according to the present invention can control the motor 14 in the same way in both the forward and reverse directions of rotation by using the single motor control circuit 12.

Figure 4:
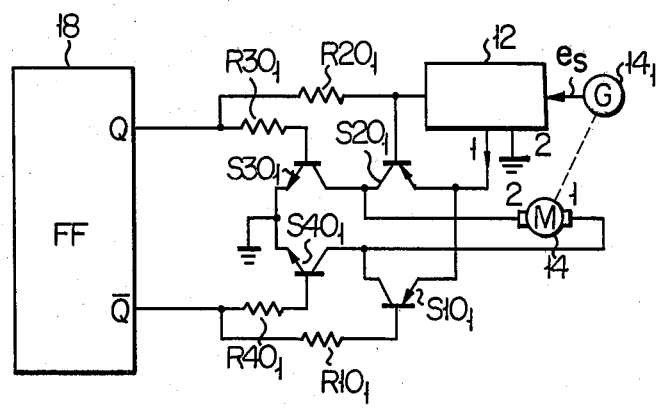
FIG. 4 illustrates in block and circuit forms a modification of the circuit shown in FIG. 3.

A modification of the embodiment in FIG. 3 is shown in FIG. 4. Although the FIG. 3 embodiment uses NPN type transistors for the switch transistors S10 to S40, the FIG. 4 embodiment uses combination of the NPN and PNP type transistors. In the forward rotation of the motor 14, logical levels "1" and "0" at the output terminals Q and $\overline{Q}$ of the flip-flop 18 turn on an NPN transistor $S30_1$ and a PNP transistor $S10_1$. In the reverse rotation of the motor 14, logical levels "0" and "1" at the output terminals Q and $\overline{Q}$ turn on a PNP transistor $S20_1$, and an NPN transistor $S40_1$. In FIG. 4, a frequency generator $14_1$ for generating the servo detection signal $e_s$ and the motor 14 are separately illustrated. FIGS. 2 and 3 are illustrated on the assumption that the generator $14_1$ is contained in the motor 14. The servo detection signal $e_s$ may be obtained, with bridge-detection, by detecting power caused by a counter electromotive force of the armature in the motor 14, alternatively.

Figure 5:
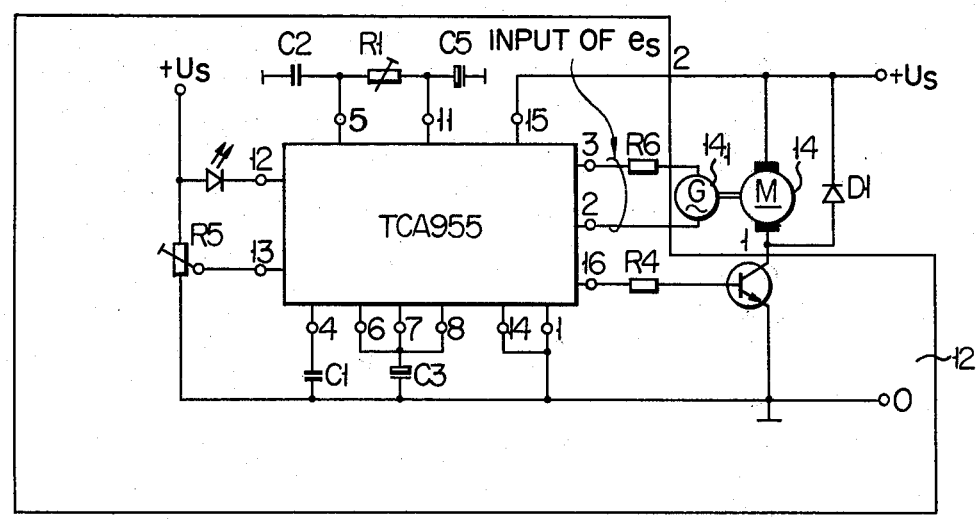
FIG. 5 is a circuit diagram of a conventional motor controller used in the circuits shown in FIGS. 2 to 4.

FIG. 5 shows a circuit diagram of the type device disclosed in the application note published by SIEMENS Co. In FIG. 5, there are illustrated the output terminals 1 and 2 of the control circuit 12 shown in FIGS. 2 to 4 and an input circuit of the servo detection signal $e_s$. Note here that the constructions disclosed above do not limit the present invention, but may be modified and changed variously within the scope of the invention. For example, the double-gang two-contact type switch 16 shown in FIG. 2 may be substituted by an electronic switch (not shown) using a thyristor. Conversely, the switch circuits S10 to S40 may be replaced by a mechanical switch of four-gang type.

What is claimed is:

1. A rotary direction reversing apparatus for a motor of a microcassette type tape recorder, comprising:
    a microcassette tape transport having a rotatable capstan for driving a recording tape in a microcassette in both forward and reverse directions of tape transporting;
    reversible motor means including a single motor provided in said tape transport for selectively driving said capstan in opposite rotational directions to selectively transport said tape in respective reverse directions, said motor means having substantially the same characteristic for both the forward and reverse directions of rotation thereof;
    said tape transport being arranged such that the mechanical load applied to said motor means via said recording tape is substantially the same for both the forward and reverse directions of recording tape transporting;
    motor control means for generating a motor drive current and for setting a motor speed of said motor means to a given value, said motor control means and said motor means forming a single servo loop which is operable for both forward and reverse directions of tape transporting; and
    switching means connected between said motor means and said motor control means for reversing the direction of said motor drive current generated by said motor control means and which is supplied to said motor means so that a transfer function of said single servo loop including said motor means and said motor control means is substantially fixed to be substantially the same in both directions of rotation of said motor.

2. A rotary direction reversing apparatus for a motor of a microcassette type tape recorder, comprising:

a microcassette tape transport having a single motor and a rotatable center capstan located between two heads, the mechanical configuration of said tape transport being substantially symmetrical with respect to said center capstan;

reversible motor means including said single motor provided in said tape transport for selectively driving said center capstan in opposite rotational directions to selectively transport said tape in respective reverse directions, said motor means having substantially the same rotary characteristic for both the forward and reverse directions of rotation thereof;

said tape transport being arranged such that the mechanical load applied to said motor means via said recording tape is substantially the same for both the forward and reverse directions of recording tape transporting;

motor control means for generating a motor drive current and for setting a motor speed of said motor means to a given value, said motor control means and said motor means forming a single servo loop which is operable for both forward and reverse directions of tape transporting; and switching means connected between said motor means and said motor control means for reversing the direction of said motor drive current generated by said motor control means and which is supplied to said motor means so that a transfer function of said single servo loop including said motor means and said motor control means is substantially fixed to be substantially the same in both directions of rotation of said motor.

3. A rotary direction reversing apparatus according to claim 1, wherein said switching elements each comprise a semiconductor switch device.

4. A rotary direction reversing apparatus according to claim 1 or 2, wherein said switching means comprises a two-gang two-contact switch means, and wherein the outputs of said motor control means are applied to the contact terminals of said switch means, a first terminal of said motor being connected to a first contact of a first circuit of said switch means and to a second contact of a second circuit of said switch means, and a second terminal of said motor being connected to a second contact of the first circuit of said switch means and to a first contact of a second circuit of said switch means.

5. A rotary direction reversing apparatus according to claim 1 or 2, wherein said switching means comprises first to fourth switching elements connected in a bridge fashion, the outputs of said motor control means are coupled with the connection point of said first and second switching elements and the connection point of said third and fourth switching elements, a first terminal of said motor is connected to the connection point of said first and fourth switching elements, and a second terminal of said motor is connected to the connection point of said second and third switching elements, whereby, when only said first and third switching elements are turned on, said motor is rotated in a forward direction, and when only said second and fourth switching elements are turned on, said motor is rotated in a reverse direction.

6. A rotary direction reversing apparatus according to claim 1, wherein said switching elements each comprise a transistor.

* * * * *

UNITED STATES PATENT AND TRADEMARK OFFICE
CERTIFICATE OF CORRECTION

PATENT NO. : 4,341,981

DATED : July 27, 1982

INVENTOR(S) : Akira OSANAI

It is certified that error appears in the above-identified patent and that said Letters Patent is hereby corrected as shown below:

COLUMN 2, line 46, after "141616/'78" change "corre-" to --(corre- --;

line 51, after "Mar. 2, 1982" insert --)--;

COLUMN 3, line 64, change "motor 14 as is" to --motor 14 is as--;

COLUMN 6, line 4, change "claim 1" to --claim 5--;

COLUMN 6, line 34, change "claim 1" to --claim 5--.

Signed and Sealed this

Seventh Day of December 1982

[SEAL]

Attest:

GERALD J. MOSSINGHOFF

Attesting Officer    Commissioner of Patents and Trademarks